Jan. 4, 1944.　　　　　F. P. MEYER　　　　　2,338,296
CARVING RACK
Filed April 11, 1941　　　　3 Sheets-Sheet 1
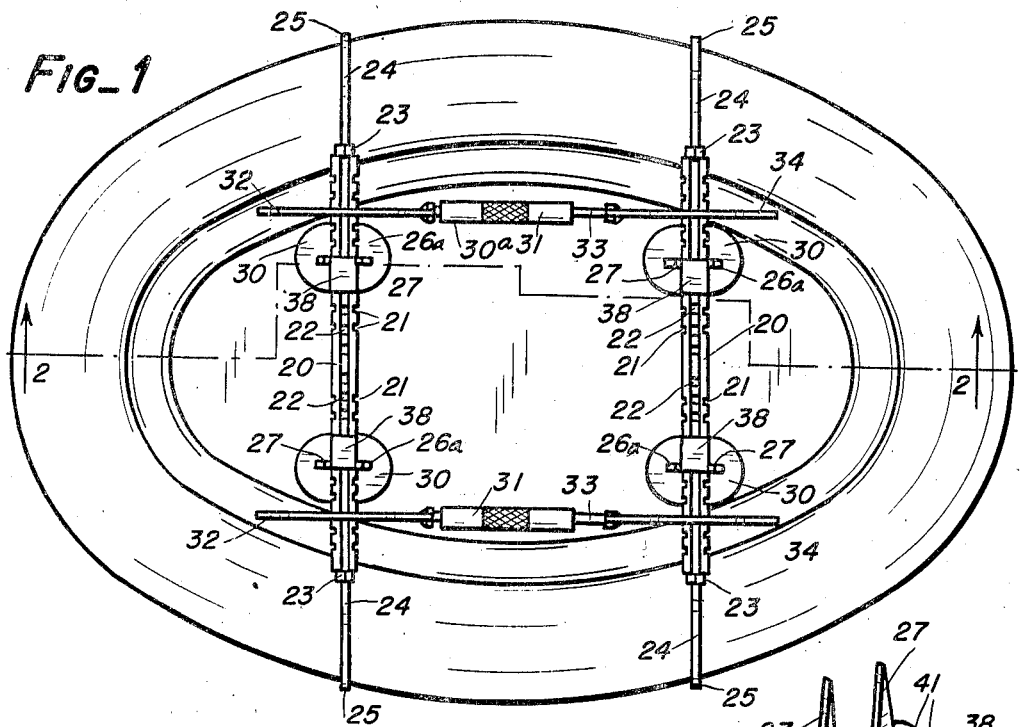
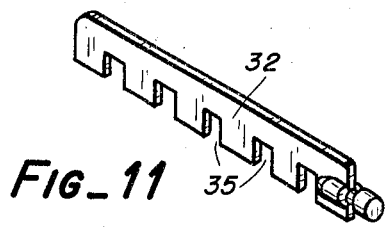
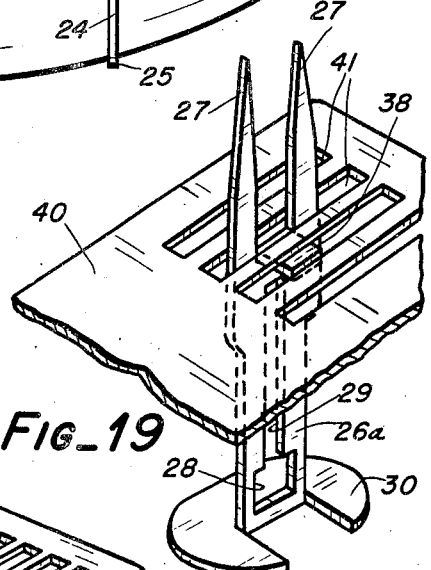
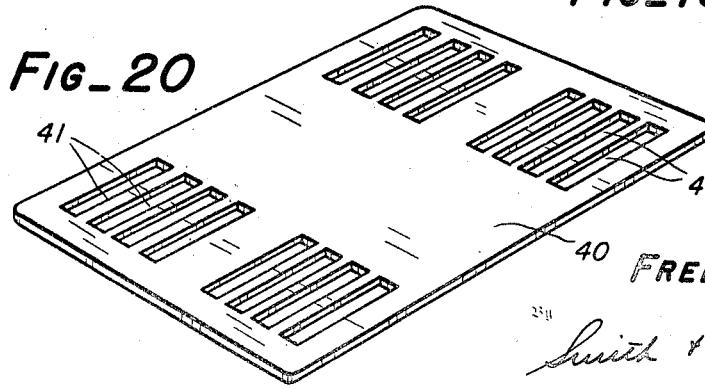
Inventor
FRED P. MEYER
By Smith & Tuck
Attorneys

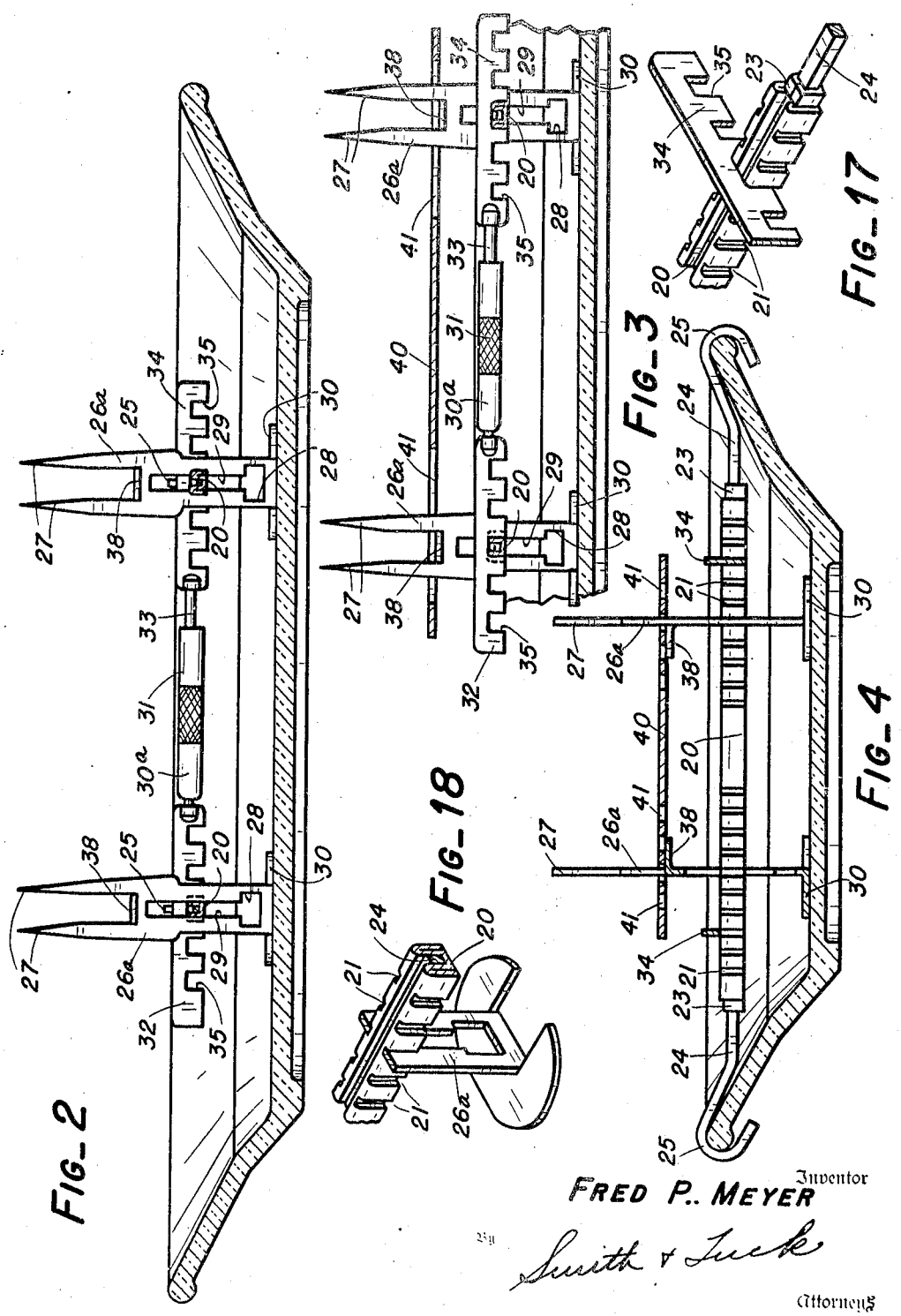

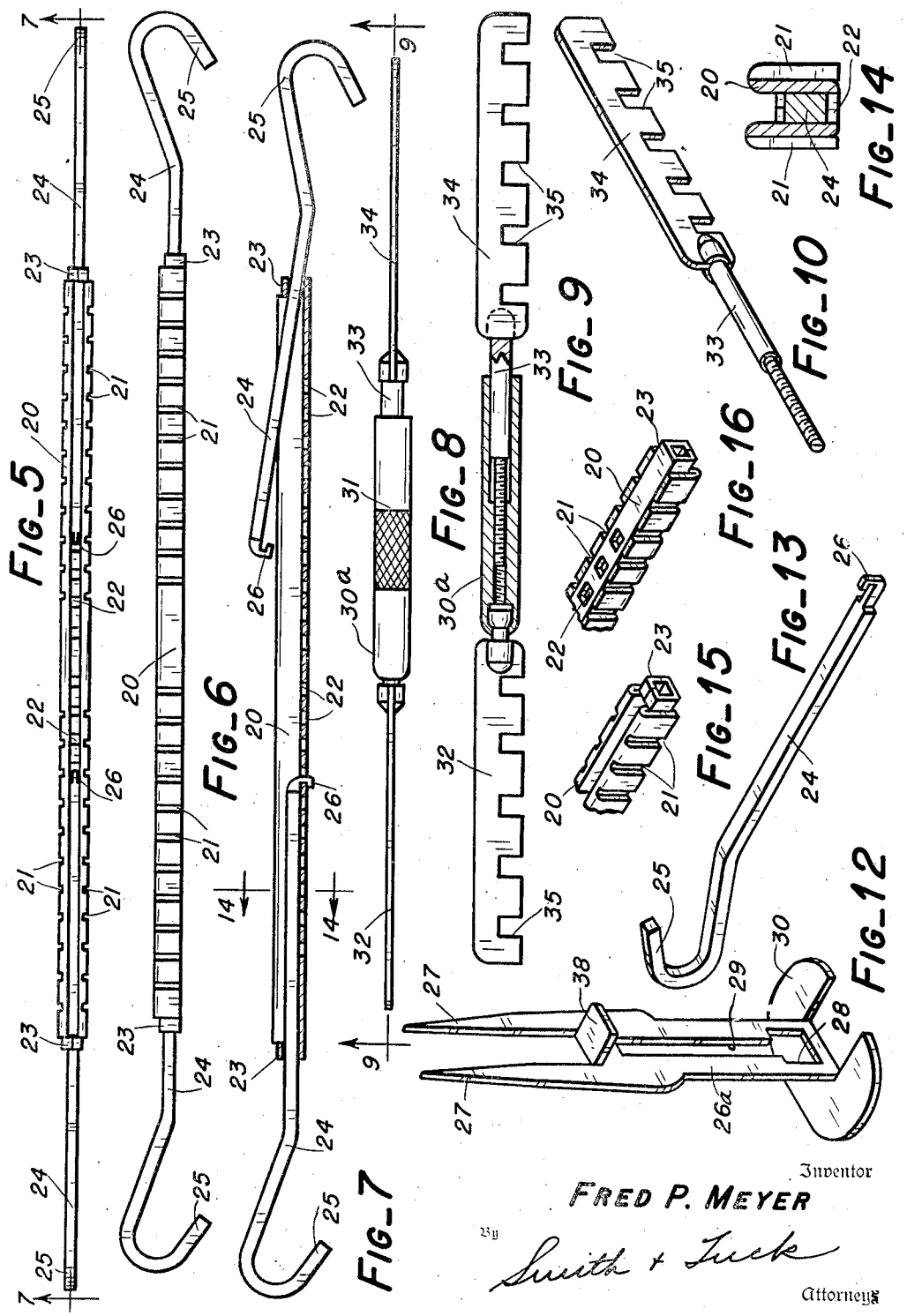

Patented Jan. 4, 1944

2,338,296

UNITED STATES PATENT OFFICE 2,338,296

CARVING RACK

Fred P. Meyer, Seattle, Wash.

Application April 11, 1941, Serial No. 388,171

2 Claims. (Cl. 65—65)

This invention relates to certain new and useful improvements in carving racks for holding fowls or meat or the like in a fixed position for the performance of the carving operation, leaving both hands free to carve and serve the meat.

It is well known that there is nothing more difficult for the average amateur host than the carving of meat at the table or in the kitchen. Usually the fowl or roast that is being carved is of an uneven, unbalanced shape which does not rest evenly on a platter or other surface and which when in position is lubricated by its own fat so that it also is extremely slippery on a smooth-surfaced platter.

Various types of clamping mechanisms and elaborate gripping mechanisms for manual operation have been provided to assist the operation. But at the same time these devices appear to beggar the issue due to the fact that they do not make provisions for the definite and positive positioning of a roast, for example, on a slippery platter.

It is an important object of my invention to provide a device that is exceedingly simple in construction and inexpensive to manufacture and which can be positioned on a platter or other holding device with great ease and convenience.

Another object of the invention is the provision of a carving rack which is adjustable to meet varying sizes and shapes of platters and the like, for attachment thereto, as well as to be accommodated to hold varying sizes of roast or fowl.

A further object of my invention is to provide a carving rack which may be manufactured of metallic or plastic materials that will not absorb juice, fats and the like as would be the case with wood and that are subject to thorough cleansing and sterilization for use, and which devices mechanically engage over the edges of a platter and grip such a device solidly and rigidly.

A still further object of the invention relates to the use, in a carving rack, of notched cross arms which may be positioned according to conditions to be met and upon which may be adjustably mounted a footed holding or impaling fork that is adaptable for ready adjustment without removal of the rack from the platter. Such adjustment is often desired when the time comes to place a roast or fowl upon the rack and platter.

Another object of my invention is the provision of means for holding meat on a platter, which means not only properly positions the meat with regard to the platter but holds it off the platter so that the juices that run therefrom are readily acceptable in the lower portion below the meat and on the platter to be collected by a spoon, or the like.

Another and further object of my invention relates to the use of tensioning means which cooperate with cross bars and bind them securely in place on a platter, which tensioning means may be easily removed when meat is to be mounted on the rack.

Other objects and advantages of the invention will become apparent during the course of the following descriptions:

In the drawings, in which I have shown a preferred embodiment of my invention, and in which I have illustrated the parts as cooperatively associated together and also as to the respective views separately disassociated from each other.

Figure 1 is a plan view of a platter having my rack and holding prongs associated therewith and with certain parts, later to be described, omitted for convenience of illustration, Figure 2 is a longitudinal sectional view taken on line 2—2 of Figure 1, with a portion of the rack shown in elevation, Figure 3 is a fragmentary longitudinal sectional view taken through the central portion of a platter on a plane similar to that of Figure 2, but with certain additional parts illustrated in association with the rack of Figure 2, Figure 4 is a lateral sectional view taken through the platter on a plane at right angles to Figure 2 and showing my rack attached to a platter, Figure 5 is a plan view of an extensible lateral support bar employed in my rack, Figure 6 is an elevational view of the device of Figure 5, Figure 7 is a longitudinal sectional view taken on line 7—7 of Figure 5, Figure 8 is a plan view of a tie bar or tension bar used in connection with the lateral bars of Figures 5, 6, and 7, for positioning them upon a platter, Figure 9 is a longitudinal sectional view taken on line 9—9 of Figure 8, Figure 10 is a perspective view of the right end member of the device shown in Figure 9, Figure 11 is a perspective view of the left end member of the device shown in Figure 9, Figure 12 is a perspective view of an upright fork member employed in connection with the bars of Figures 5 and 6 and upon which a roast or the like is impaled for proper positioning, Figure 13 is a perspective view of a platter engaging hook used in connection with a notched bar of Figures 5 and 6, Figure 14 is an enlarged cross-sectional view as though taken on line 14—14 of Figure 7, Figures 15 and 16 are fragmentary perspective views of the top and bottom of one end of a notched bar used laterally in forming my rack on a platter, Figure 17 is a fragmentary perspective view showing the manner in which a notched end member of a tensioning device is engaged over a notched lateral bar for positive positioning of the two with relation to each other, Figure 18 is a perspective view illustrating the manner in which the fork member engages a notched lateral bar for positive positioning with relation thereto, Figure 19 is a perspective view of a footed fork member disassociated from the lateral bar but with a supplementary carving platform or plate indicated as resting thereon, Figure 20 is a perspective view of a supplemental carving plate used in connection with my carving rack.

In the primary embodiment of my invention I employ a pair of U-shaped cross bars designated by the numeral 20, each of the cross-bars has notches 21 on either side thereof and spaced along its length in opposition to each other. Bar 20 also has bottom perforations 22 and at its end the bar is provided with a square ferrule 23, through which may be inserted the shank 24 of a platter-engaging hook member 25. The shank 24, at the end opposite the platter-engaging hook, is also provided with a latch hook 26 which may be engaged in any one of the holes 22 to maintain the shank 24 in an adjusted position with relation to the member 20. This adjustment is best illustrated in Figure 7 where, due to the looseness of the fit of the ferrule 23 with relation to the cross-sectional area of the shank 24, the hook end 25 may be depressed to lift and disengage the hook 26 from a hole 22. By sliding the shank 24 within the ferrule to extend or retract the shank with relation to the member 20, a proper adjustment may be provided.

A pair of the assemblies that have been described above are engaged on the platter in the manner shown in Figure 1 in a spaced apart relationship, each one being positioned preferably adjacent an end of a platter or lying along opposite sides thereof. When the hooks 25 are properly adjusted so that the bars 20 will be more or less evenly positioned, the footed fork member 26a is also positioned in pairs in relation to the bars 20. Footed member 26a has impaling prongs 27 and a lower opening 28 having a restricted throat slot 29 thereabove. On its lower end is the base or foot 30.

When properly positioned, the members 26a have their footed portions 30 resting on the bottom of the platter and the throat 29 engaged in the notches 21 of the member 20 so that the fork tines 27 are directed upwardly to adjust these along the length of the bar 20, they merely need to be lifted so that the enlarged portion or slot 28 which is greater in area than the cross-section of the member 20, will be slid along the bar until the proper notch is reached and then that notch is engaged by the throat 29.

When the lateral bars 20 are properly positioned on the platter, it is advisable to tension them, or tighten them and for that purpose I employ the adjustable turn buckle member 30a, having a buckle 31 adapted for manual turning and which has freely swiveled in one end the notched end plate 32, and in the other end the threaded shank 33 of the notched end plate 34. Each of these plates has a plurality of notches 35 adapted to engage over the bars 20 in cooperation with the notches 21 thereon.

Wherever it is convenient to place this turn buckle member 30a is practical for most uses and merely by turning the buckle members 31 the entire rack can be tightly bound in position on a platter, due to the curvature of the platter which prevents the hooks 25 from slipping more closely together.

Each of the footed fork members 26a has a shoulder flange or member 38 which stands out at approximately right angles therefrom adjacent the foot of the impaling prongs 27. A supplemental supporting plate 40 is used in connection with my device and the plate 40 has a plurality of slots adjacent its respective corners that are adapted to fit over the fork tines 27 no matter what their adjusted position may be.

When this plate 40 is slipped over the device in the manner suggested in Figures 3 and 4 a very substantial platform is provided, and in this platform are positioned four impaling forks which extend through the slots 41. A roast may be set thereupon and the fork tines inserted into the meat so that the weight of the meat will keep it from moving laterally on its carving platform.

It will be seen that such juices and liquids as may flow from the meat will be deposited generally in the platter below the mechanism in such a way that a person with a spoon may very easily get to this liquid for dispensing it.

All of the parts of this device are manufactured of either metal or plastic and stainless steel is found to be a very useful material. In other instances material that would otherwise stain may be plated or finished to prevent discoloration or corrosion should they be placed where such action could occur.

While the device that I have shown herein is intended as the preferred form of my invention it is to be understood that alterations and changes in the general arrangement of the parts of the structure, and of the structure itself may be made without departing from the scope of my invention.

I claim:

1. A meat carving rack for use with platters, which rack, in position on platter, comprises: a pair of contractible crossbars having means engaging the edge of the platter to retain the bars in fixed relation thereto, each of said bars having a series of notches arranged in pairs along opposite sides of the bars; a plurality of forks resting on the platter and having upwardly directed tines for impaling meats to be positioned by the rack for carving, each said fork having a slot of a width equal to the cross section of a bar at a pair of opposed notches and placed astraddle one of said bars to be retained against dislocation; a meat supporting platter having openings permitting the insertion of the tines of the forks whereby the platform will be disposed below the tips of the upwardly directed tines; and means on the forks for supporting said platform above the platter in meat supporting position whereby a meat portion to be carved may be supported by and also impaled upon the tines of the fork.

2. A meat carving rack, comprising: bars having means to engage opposite portions of a platter edge whereby said bars may be retained in fixed position thereto, said bars having a pair of notches each of which is formed in opposite sides of the bar, and upwardly directed meat impaling forks to rest on a platter to which the bars are attached, each fork having a slot of a width to straddle a bar at the paired notches therein whereby the fork is retained against dislocation with the tines in meat impaling upward direction.

FRED P. MEYER.